United States Patent Office 3,112,382
Patented Nov. 26, 1963

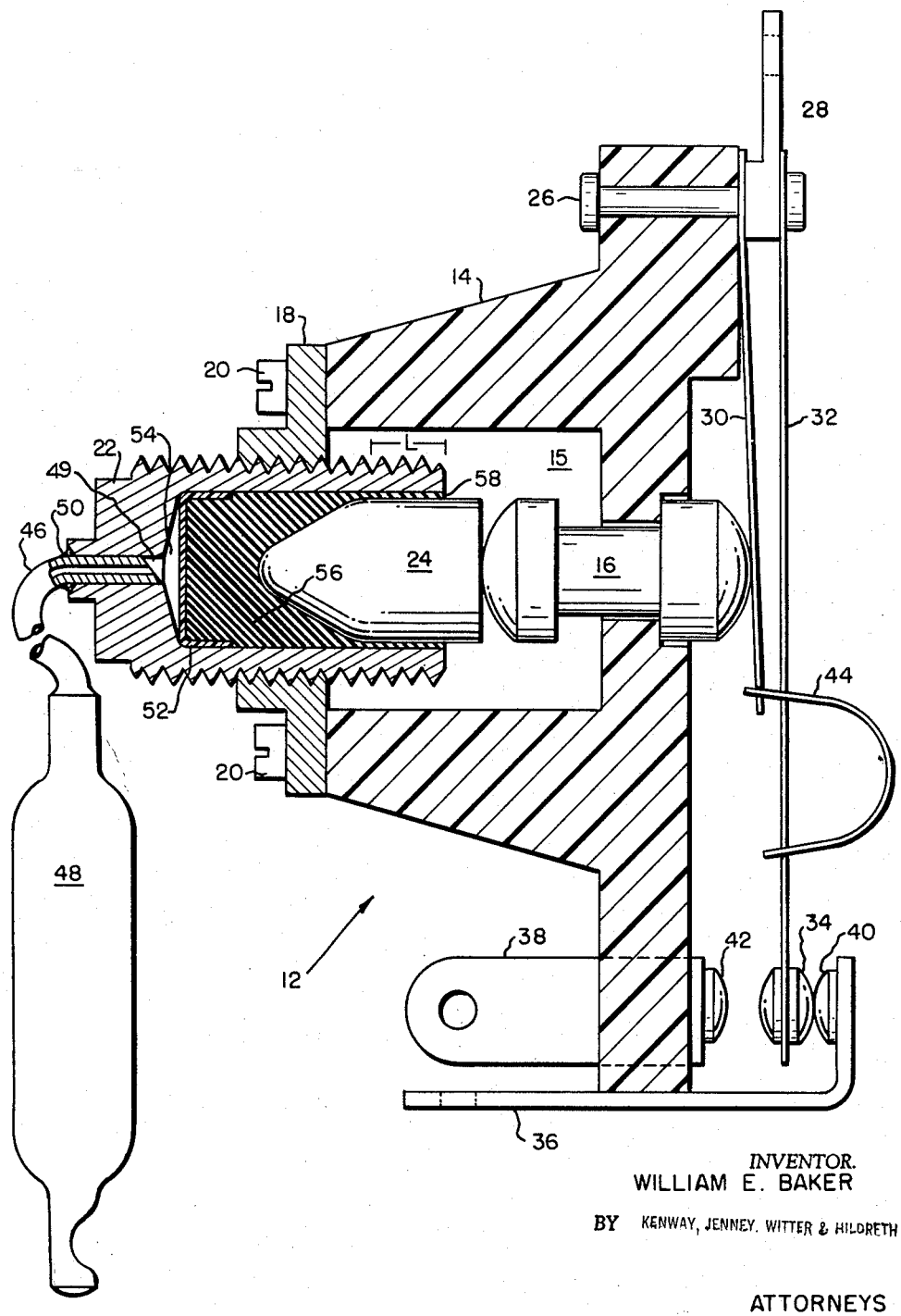

3,112,382
PRESSURE-RESPONSIVE ACTUATING DEVICE
William E. Baker, Needham, Mass., assignor to Standard-Thompson Corporation, Waltham, Mass., a corporation of Delaware
Continuation of application Ser. No. 690,381, Oct. 15, 1957. This application Oct. 19, 1959, Ser. No. 847,238
5 Claims. (Cl. 200—82)

The present invention relates generally to pressure-responsive actuating devices, and more particularly to devices of the type having a sealed expansible space for a pressure-transmitting medium and an actuator element adapted to be moved in response to changes in the pressure of the medium. This application is a continuation of my copending application Serial No. 690,381, filed October 15, 1957, now abandoned.

The invention belongs to that class of actuators in which there is provided a rigid housing and a body of resilient elastomeric material within the housing which define the space for the pressure-transmitting medium, whereby the pressure in the medium is brought to bear upon the elastomer. An actuator member, commonly a pin, is received in the housing and bears against the elastomer. The function of the elastomer is to seal the pressure medium within the housing, while transmitting a longitudinal thrust to the operating element. This class of actuators has been the subject of considerable development in recent years due to certain inherent advantages over the familiar diaphragm and bellows types previously employed, especially for thermostatic applications.

Typical specifications for an actuator call for an operating element which shall move a specified distance against a specified reactive force in response to a given change in control temperature. Since sensitivity is an important advantage in any case, the desirability of producing the specified response with a minimum volume of thermal medium is at once apparent. With a given small volume of thermal medium, a given small change of volume will occur over a given temperature range. In this class of actuators, this volume change can produce only a substantially equal volume displacement of the pin. The latter must therefore have a small enough diameter to permit it to move through a given axial displacement corresponding to this same temperature range.

The small diameters of pins in this type of actuator and the pin loads commonly applied in operation result, therefore, in very large unit pressures within the thermal medium and the elastomeric body. Indeed, certain applications require internal pressures of as much as 10,000 p.s.i. It will be apparent that there are serious problems of leakage of thermal medium and extrusion of the elastomeric body between the operating element and the actuator housing. It is a principal object of this invention to overcome these problems arising from high pressure conditions.

A common although expensive approach to the foregoing problems is to manufacture both the operating element and a cooperating sleeve bearing in the housing with extreme precision, thereby tending to minimize the opportunity for extrusion of the elastomeric body. An object of this invention is to provide a cheaper alternative whereby the actuator pin and its bearing are only required to fall within certain relatively larger tolerances of fit, provision being made whereby the elastomer will not be extruded through minor irregularities or imperfections in fit caused by low-cost production operations.

Another object is to provide improvements in the mode of operation of actuators of the foregoing class, and in particular, a novel means for sealing the elastomer and the pressure-transmitting medium against the induced pressures.

With the foregoing and other objects in view, the features of the invention include the provision of an improved elastomeric body having a thin sleeve-like integral extension bonded to the sleeve bearing into which the actuator pin is fitted. This sleeve-like extension is bonded to the housing but permits the pin to slide easily in response to changes in the pressure applied to the elastomer. Due to the principle of operation discussed above, the pin may be of relatively small diameter and may travel a considerable axial distance in response to a relatively small absolute change in volume of the thermal medium. Thus the actuator is relatively sensitive and provides better temperature control through a reduced operating differential. In some instances this type of actuator may be designed to meet the same temperature-displacement specifications as a corresponding bellows-type actuuator with only one-eighth the volume of thermal liquid required by the latter.

Another feature is that the bond between the elastomer and the housing prevents the extrusion of the elastomer around the pin, while at the same time providing a seal for the thermal medium.

A further feature resides in the fact that given characteristics, including long pin travel for a given temperature differential, are obtained with a minimum of metal because the components are of circular cross-section, this being the shape most economically adapted to withstand large internal pressures.

The foregoing and other features of the invention will be better understood by reference to the following description of a preferred embodiment thereof adapted for operating a snap-action switch having reference to the appended drawing thereof showing the actuator in axial cross-section.

Referring to the drawing, there is illustrated a snap-action switch assembly 12 having a body portion 14 formed of a suitable insulating material, for example a phenolic resin, molded or otherwise suitably formed with an annular portion defining a cylindrical space 15. An integral wall closes an end of the space. A rigid metal member 16 with a rounded end is slidably received in an aperture in the latter wall.

The open end of the space 15 is closed by a metal mounting plate 18 secured to the body 14 by cap screws 20. The plate 18 is internally threaded to receive an outside-threaded housing 22 forming a part of the actuator. Projecting from the housing 22 is a steel pin 24 having a generally conical, blunted end, which comprises the operating element of the actuator and bears upon the member 16.

A rivet 26 secures a terminal lug 28 to the body 14 between thin spring steel leaves 30 and 32. The leaf 32 has a contact button 34 secured thereto in any suitable manner.

Lugs 36 and 38 are also suitably secured to the body 14, and these support fixed contact buttons 40 and 42, respectively. A curved spring steel snap yoke 44 is pivotally attached to the leaves 30 and 32 as illustrated, thereby forming a toggle switch operating according to principles familiar to those skilled in this art. It will be understood that the illustrated form of switch is intended merely to show a specific application of the actuator, and that other forms of devices may be situated to bear upon the pin 24 and to be actuated thereby in response to a change in its position. Thus, while the illustrated switch is designed to be operated by a very small motion of the pin 24, the described actuator may readily operate other types of devices such as poppet valves which require greater translation between operating limits.

The thermostatic actuator for the switch comprises the housing 22, a capillary 46 and a bulb 48. The capillary 46 is received in a hole 49 in the housing 22 and is hermetically soldered thereto at 50. The bulb 48 is situated in position to sense the control temperature and is ordinarily remote from the switch.

A cup-shaped insert 52 of nylon, "Teflon" (a tetrafluoroethylene polymer) or equivalent flexible material is received in the housing 22 at one end of a cylindrical bore therein. The end wall of the bore is tapered by the drill bit to produce a cone-shaped space 54 communicating with the hole 49. The space 54, the capillary and the bulb are entirely filled with a suitable thermal fluid such as, for example, ethylene glycol. It will be understood that other thermal materials such as waxes may be employed when the unit is adapted to sense a local temperature and no capillary is used. It will also be understood that in place of the bulb 48 I may provide a coiled extension of the capillary 46 or a coiled thin-walled tube joined to an end of the capillary, the object in any case being to cause most of the thermal fluid to be situated in position to sense the control temperature, and preferably to provide a circular cross-section throughout the pressurized part of the system.

A resilient elastomeric body 56 of rubber or a suitable rubber substitute is received in the housing 22, fits the inner surface of the cup 52, and closely surrounds the pin 24. The body 56 has a cavity closed at one end for the pin and a thin sleeve-like integral extension 58 separating the wall of the pin from the inner surface of the housing. The entire surface of contact between the body 56 and the inner wall of the housing 22 is bonded, whereby a shearing stress between the body and housing is adequately resisted. The body 56 is not bonded to the cup 52.

In operation, upon an increase in the temperature sensed by the bulb 48 the pressure of the thermal fluid increases, causing the cup 52 to bow inwardly toward the pin 24. This produces a volumetric displacement of the elastomeric body 56, and since this body has very small compressibility a corresponding volumetric displacement of the pin 24 is produced. The pin moves outwardly from the housing 22 and the elastomer follows it so that no void is created within the housing between the operative limits of movement of the pin. The pin urges the slidable member 16 against the spring leaf 30 which applies a reactive force thereto. Upon a decrease in the thermal fluid pressure, the force of the spring leaf 30 overcomes that of the pin 24 and the latter moves into the housing to compensate for the reduction in volume of the thermal fluid.

The actuator is preferably fabricated in the following manner. First, the housing 22 is bored and threaded, these operations being relatively rapid and inexpensive due to the simplicity of shape. Next, the formed cup 52 is inserted in the illustrated position. The housing 22 is then placed in a fixture having a small upstanding pin, the pin extending into the housing through the hole 49 approximately to the apex of the space 54. The inside surface of the housing except the part covered by the cup 52 is then coated with a suitable bonding material. A mold pin having an external surface identical with that of the pin 24 is lowered into the housing 22, this pin having an axial hole to permit the injection of liquid uncured rubber or other elastomeric material and an external surface lubricated by a silicone grease or the like to permit easy withdrawal after molding. The material is injected into the housing 22 at pressures in the region of 2,000 to 3,000 p.s.i., these pressures being sufficient to form the integral sleeve extension 58. While under pressure in the mold the body tends to deflect the cup 52, but the cup strikes the end of the pin in the hole 49 and the bottom of the housing and is arrested thereby. While the pressure is sustained the housing is then heated to approximately 315° F. to cure the elastomeric body and bond it to the housing.

The pressure is then relieved, and the cup 52 returns toward its rest position to clear the bottom of the housing due to a slight thermal contraction of the elastomer. It will be understood that the elastomer does not necessarily adhere to the insert but conforms closely to it.

It will be noted that there is an appreciable difference between the outer diameter of the pin 24 and the inner diameter of the housing 22. The resulting space is filled by the integral extension 58 of the body 56. The principal factors which determine the optimum length and thickness of the extension 58 include the dimensional tolerances of the pin and bearing, the strength of the rubber-to-metal bond, the properties of the elastomer and the maximum pressure to be applied by the thermal fluid. Since the effectiveness of the extension 58 is in any case dependent on its continuity around the pin, its thickness is preferably greater than the sum of the tolerances for the radius of the sleeve bearing, the tolerance of the pin, the thickness of the bonding material and concentricity tolerances. At the other extreme, its thickness is limited to a value such that the elastomer will not be forced out of the housing and such that the applied pressure induces a substantially uniform unit stress in shear on the rubber-to-metal bond, this stress being less at every point than the maximum which can be applied without rupture of the bond.

Between the foregoing limits an optimum design thickness and length of the extension 58 are found. The dimensional relationships are preferably determined by empirical methods. An idealized example may be taken, in which the pressure within the extension 58 adjacent the mouth of the housing 22 is assumed to be zero and the pressure at the other end of the length thereof is substantially equal to that of the thermal fill. If we consider a differential transverse slice of the sleeve 58, the reaction in shear of the annular bond between this slice and the housing 22 substantially equals the drop in unit pressure between its end faces multiplied by the cross-sectional area of the slice. From this consideration it follows that throughout the length L wherein the cross-sectional area of the rubber is substantially constant, the ideal pressure gradient would be linear with the bond at the periphery of each slice of equal thickness applying an equal reaction in shear.

To produce the desired pressure gradient, it must be recognized that rubber and rubber-like materials are not true fluids, and that the application of pressures to these bodies results in pressure gradients dependent upon their dimensions and elatsic properties. For this reason, the preferred length, shape and thickness of the extension 58 are preferably empirically determined as the minimum values which will produce a substantially linear pressure drop in the above example, and in any case a stress in shear which is uniform throughout the area of the bond.

The induced pressure within the body 56 is in many cases substantially uniform throughout that portion of the body between the cup 52 and the inner extremity of the pin 24. Substantially the full drop from this pressure to atmospheric pressure occurs within the length L of the cylindrical extension 58. Since shearing stress upon the bond occurs only in those regions where a pressure drop occurs, it is clear that the slope of the pressure gradient is a function of the length L. Thus the shearing stress upon the bond per unit area may be reduced by increasing the length of the extension 58. However, this increase must be correlated with the thickness of the extension, taking into account the properties of the elastomer as explained above, in order to produce a uniform shearing stress at all points.

Along the portion of the area of contact between the body 56 and housing 22 where little pressure drop occurs, little shearing stress is applied to the bond, but the bond in this portion is useful to provide a further seal against leakage of thermal fluid from the space 54.

While the invention has been described with reference to a specific embodiment, this has been done for purposes of specific illustration and various modifications in and adaptations and arrangements of the parts may be employed for other specific applications in accordance with procedures already familiar to those skilled in this art, and without departing from the spirit or scope of the invention.

Having thus described the invention, I claim:

1. A pressure-responsive actuator having, in combination, a hollow housing having a sleeve-like opening therein, a body of resilient elastomeric deformable material within the housing having an inner end portion with a closed inner end face presented to a space within the housing and having an integrally molded outer thin-walled portion forming a bearing sleeve bonded to the interior surface of said sleeve-like opening, said thin-walled portion being axially unconfined at its outer end, a pressure-transmitting medium confined within said space in the housing in position to act on said inner end face, a rigid actuator member having a portion of uniform cross-section closely and slidably fitted within said thin-walled portion of said body and out of contact with the housing and having an end closely fitted to and terminating within said inner end portion of the body, and external resilient restraining means engaged with the housing and tending to resist movement of the actuator member outwardly of the housing, whereby pressure exerted on said inner end face of the body by the pressure-transmitting medium deforms said inner end portion of the body against the end of said actuator member and causes the latter to slide outwardly of the housing.

2. The combination of claim 1, wherein the thickness of the bearing sleeve is of the same order of magnitude as the sum of the manufacturing tolerances of the sleeve-like opening in the housing and the adjacent wall of the actuator member.

3. The combination of claim 1, with the housing having a pair of openings therein, one of said openings being connected by a capillary to a space remote from the housing.

4. The combination of claim 1, wherein the pressure-transmitting medium includes a cup-like element received in the housing and fitting closely about the inner end face of the deformable body.

5. The combination of claim 1, wherein the pressure-transmitting medium includes a thermal sensitive expansible-contractible material.

References Cited in the file of this patent
UNITED STATES PATENTS

| | | |
|---|---|---|
| 2,208,149 | Vernet | July 16, 1940 |
| 2,798,130 | Cox | July 2, 1957 |
| 2,806,376 | Wood | Sept. 17, 1957 |
| 2,817,727 | Schmeling | Dec. 24, 1957 |
| 2,836,671 | Langstroth | May 27, 1958 |
| 2,839,926 | Woods et al. | June 24, 1958 |
| 2,847,033 | Baker | Aug. 12, 1958 |
| 2,917,925 | Branson | Dec. 22, 1959 |
| 2,941,404 | Woods | June 21, 1960 |
| 2,944,125 | Oliveau | July 5, 1960 |
| 2,949,132 | Asakawa et al. | Aug. 16, 1960 |